United States Patent
Alles et al.

(10) Patent No.: US 8,295,763 B2
(45) Date of Patent: *Oct. 23, 2012

(54) SYSTEM AND METHOD FOR IDENTIFYING THE PATH OR DEVICES ON THE PATH OF A COMMUNICATION SIGNAL USING (1+R(T)) AMPLITUDE MODULATION

(75) Inventors: Martin Alles, Vienna, VA (US); Joseph P. Kennedy, Jr., Great Falls, VA (US); John P. Carlson, Dulles, VA (US)

(73) Assignee: Andrew LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/299,006

(22) Filed: Nov. 17, 2011

(65) Prior Publication Data

US 2012/0064821 A1 Mar. 15, 2012

Related U.S. Application Data

(63) Continuation of application No. 10/586,744, filed on Jun. 23, 2008, now Pat. No. 8,078,099.

(51) Int. Cl.
*H04B 7/15* (2006.01)

(52) U.S. Cl. ......... 455/11.1; 455/23; 455/67.13; 455/15
(58) Field of Classification Search ................ 455/11.1, 455/7, 20, 500, 16, 15, 24, 517, 67.11, 63.1, 455/334, 67.13, 501, 9, 23
See application file for complete search history.

(56) References Cited

U.S. PATENT DOCUMENTS

| | | | |
|---|---|---|---|
| 6,370,185 B1 | 4/2002 | Schmutz et al. | |
| 6,501,955 B1* | 12/2002 | Durrant et al. | ............. 455/456.1 |
| 7,062,224 B2* | 6/2006 | Baker et al. | ....................... 455/9 |
| 7,295,808 B2* | 11/2007 | Soliman | ..................... 455/13.1 |
| 2002/0044594 A1 | 4/2002 | Bongfeldt | |
| 2004/0095992 A1 | 5/2004 | Balaberda | |

* cited by examiner

*Primary Examiner* — John J Lee
(74) *Attorney, Agent, or Firm* — Duane Morris LLP

(57) ABSTRACT

A system and method of applying a known modification to a signal to enable a determination of a signal received by a first node is received directly from a second node or indirectly through a repeater. The repeater receives a primary signal and creates a secondary signal as a function of the primary signal and a known modification, wherein the known modification identifies the repeater. The primary signal is transmitted and injected with the secondary signal as the first signal to the primary receiver.

9 Claims, 7 Drawing Sheets

SYSTEM AND METHOD FOR IDENTIFYING THE PATH OR DEVICES ON THE PATH OF A COMMUNICATION SIGNAL USING (1+R(T)) AMPLITUDE MODULATION

CROSS REFERENCES

This non-provisional application is a continuation application of and claims priority benefit of U.S. patent application Ser. No. 10/586,744 titled SYSTEM AND METHOD FOR IDENTIFYING THE PATH OR DEVICES ON THE PATH OF A COMMUNICATION SIGNAL USING (1+r(T)) AMPLITUDE MODULATION, filed Jun. 23, 2008 which claims priority benefit of the following three provisional patent applications: Provisional Patent Application Ser. No. 60/570,081, titled SYSTEM AND METHOD FOR IDENTIFYING THE PATH OR DEVICE ON THE PATH OF A COMMUNICATION SIGNAL USING (1+r(t)) AMPLITUDE MODULATION, filed May 12, 2004, the contents of which are herein incorporated by reference;

Provisional Application Ser. No. 60/570,082, titled SYSTEM AND METHOD FOR IDENTIFYING THE PATH OR DEVICES ON THE PATH OF A COMMUNICATION SIGNAL filed May 12, 2004, the entirety of which is hereby incorporated by reference; and Provisional Patent Application Ser. No. 60/570,067, titled SYSTEM AND METHOD FOR DETECTING A MOBILE STATION OPERATING THROUGH A REPEATER, filed May 12, 2004, the contents of which are herein incorporated by reference.

BACKGROUND

Applicant's disclosure is directed generally towards a wireless communications network for determining whether a signal from a mobile appliance is operated on by a repeater or other network device.

The use of wireless communication devices such as telephones, pagers, personal digital assistants, laptop computers, etc., hereinafter referred to collectively as "mobile appliances," has become prevalent in today's society.

FIG. 1 shows a conventional mobile-appliance communication system having base stations 10*a-c* for communicating with a mobile appliance 20. Each base station 10 contains signal processing equipment and an antenna for transmitting to and receiving signals from the mobile appliance 20 as well as other base stations. A Base Station Controller ("BSC") and/or Mobile Switching Center ("MSC") 45 typically is connected to each base station 10 through a wire line connection 41.

To meet the ever growing demand for mobile communication, wireless communication systems deploy repeater stations to expand range and concentration of coverage. In FIG. 1, a repeater 50*a*, associated with base station 10*a*, is located to extend the coverage area to encompass the back side of the mountain 1. The repeater 50*b*, associated with base station 10*c*, is mounted on a building and is used to provide service within the building 2.

Repeaters typically fall into two categories: (1) non-translating, also known as wideband, and (2) translating, also known as narrowband. As shown in FIG. 2*a*, a non-translating repeater 250 simply passes the forward $F_{f1}$ and reverse $R_{f1}$ frequencies from the base station 210 and mobile appliance 220 respectively to and from the repeater coverage location. Often wideband repeaters are "in-building" or serve limited coverage areas. While the description of non-translating repeaters above and translating repeaters below are described in reference to frequency, their operation can equally be described in terms of channels, and the use of the term frequency should not be construed to limit the scope of the present disclosed subject matter.

A translating repeater assigns the mobile to a different traffic channel unbeknownst to the base station, mobile switch, MPC, and the base station controller. As shown in FIG. 2*b*, the translating repeater uses the base station traffic channel $R_{f1}$ for repeater 250 to base station 210 communication while the mobile appliance 220 utilizes a separate frequency $R_{f2}$ for mobile to repeater communications. Translating repeaters act similarly in the forward direction using $F_{f1}$ from the base station 210 to the repeater station 250 and $F_{f2}$ from the repeater station 250 to the mobile appliance 220. In both cases, the existence of the repeater is usually transparent to the network.

The function of the repeater station can be assumed to be equivalent to converting all signals in some received bandwidth from a Radio Frequency (RF) to some Intermediate Frequency (IF). The IF signal bandwidth is then up-converted by suitably frequency shifting this bandwidth while concurrently applying both amplification and a fixed delay to the signals.

For example, let the set of signals transmitted by N mobiles in the repeaters' input bandwidth be denoted by $$S(t) = \sum_{k=1}^{N} a(k)x(k, t)\sin(wt),$$

where the signal from a given mobile is denoted by x(k, t). The signal x(k, t) is contained in the repeater bandwidth and w is the angular frequency center of the RF bandwidth. The repeater downshifts the aggregate signal to generate $$D(t) = \sum_{k=1}^{N} a(k)x(k, t)\sin(vt),$$

in which v is now representative of the center of the IF bandwidth. The entire signal D(t) is now converted back to RF by operations that are equivalent to forming the signal $$R(t+T) = G\sum_{k=1}^{N} a(k)x(k, t)\sin(vt)\cos(wt - vt) + G\sum_{k=1}^{N} a(k)x(k, t)\cos(vt)\sin(wt - vt),$$

in which G is the repeater gain. The last equation can be written in a more convenient, mathematical manner by noting that R(t) can be derived from D(t) by writing it as R(t+T) =Re{G exp(j(w-v)tI(t))}, where G exp(j(w-v)t) is the complex representation of the multiplicative signal introduced by the repeater on the downshifted signal bandwidth and I(t) is the complex representation of D(t).

Essentially, the function of the repeater is to convert the RF signal to an IF signal, delay and amplify that IF signal, up-convert the signal back to RF, and transmit the signal. This is true for both translating and non-translating repeaters.

Repeaters typically communicate with the host base station via an RF link as shown in FIG. 3 between base station 310 and repeater 350*a*. This connection allows remote operation of the repeater without physical ties back to the host base station, which is particularly advantageous in rugged or other areas where laying lines are difficult or costly. Some repeaters, generally non-translating repeaters, use a fiber optic or copper wire "tether" instead of an RF link to communicate with the host base station as shown in FIG. 3, where base station 310 is connected to repeater station 350b by tether 351. RF signals are placed onto the tether at the repeater and then summed into the normal base station antenna path at the antenna feed interface 311 at the host base station. After integration into the normal base station antenna path, the signal from the repeater is indistinguishable to the base station regarding its origin (e.g., from the base station antennas or from a tether). In this tether architecture as well, the host base station has no knowledge of the repeater's existence or that a call is being served by the repeater.

Neither the base station nor the switch knows that a repeater or other network device is serving a call. For example, a repeater installed as an in-building distribution system would use indoor antennas to communicate with the indoor handsets and an outdoor antenna to communicate with the host base station. In order to accomplish this, there is a need to overcome the deficiencies in the prior art by employing a novel system and method that is capable of identifying when a mobile's signal is being received via a repeater or other network device.

In view of this need, it is an object of the disclosed subject matter to present a method for determining whether a signal is received directly from the mobile or from a repeater in the communication network.

These objects and other advantages of the disclosed subject matter will be readily apparent to one skilled in the art to which the disclosure pertains from a perusal of the claims, the appended drawings, and the following detailed description of the preferred embodiments.

DETAILED DESCRIPTION

Figure 1:
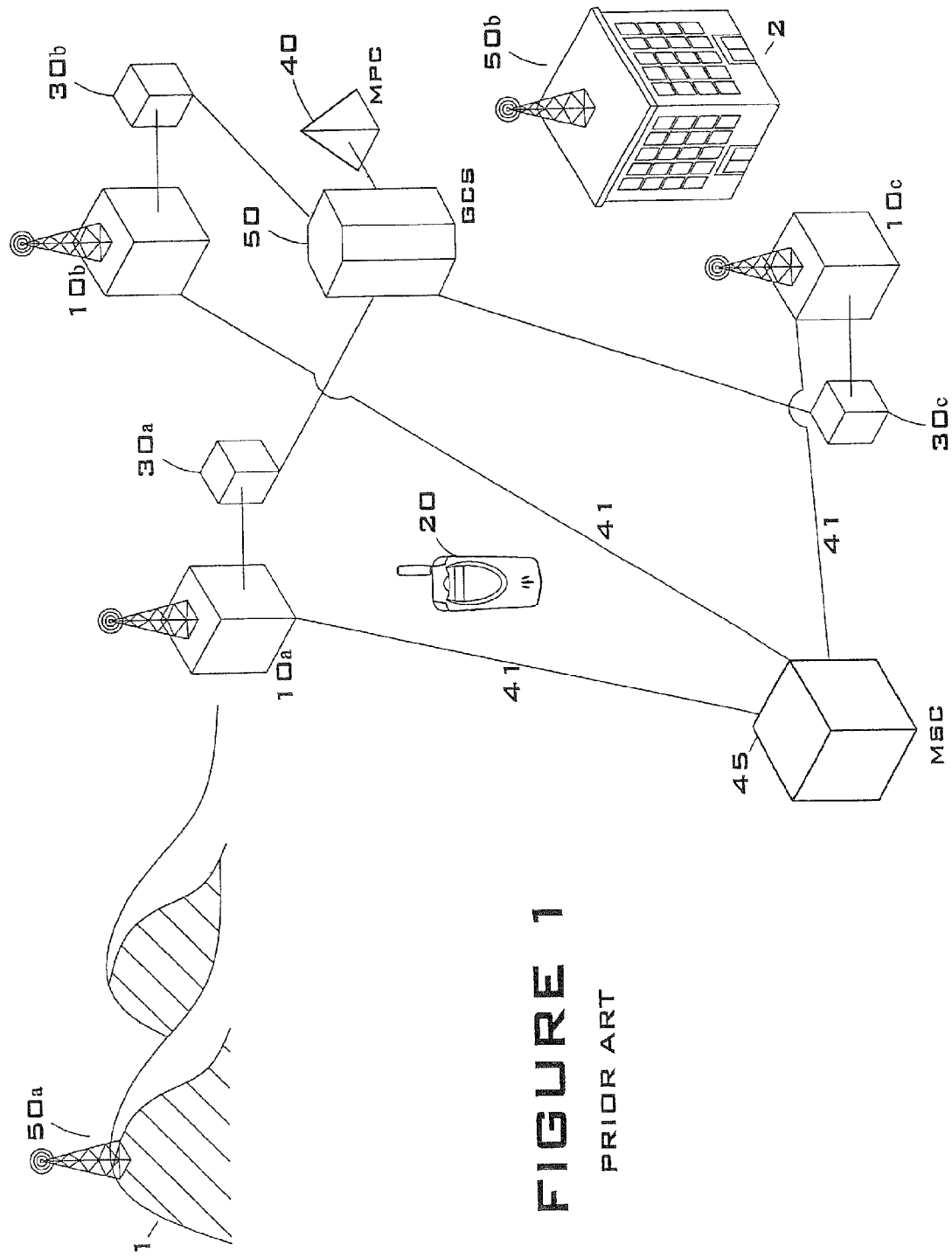
FIG. 1 is a prior art wireless communication system
Figure 2A:
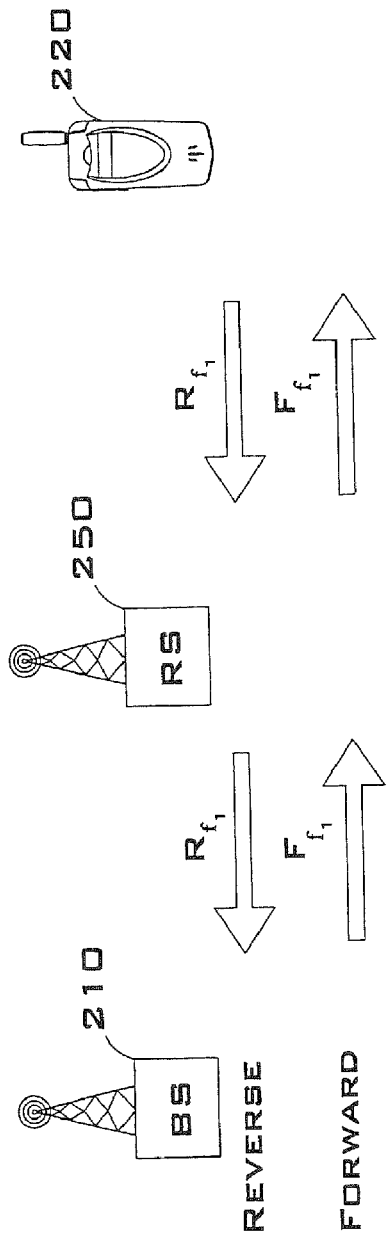
FIG. 2a is an illustration of the operation of a prior art non-translating repeater station.
Figure 2B:
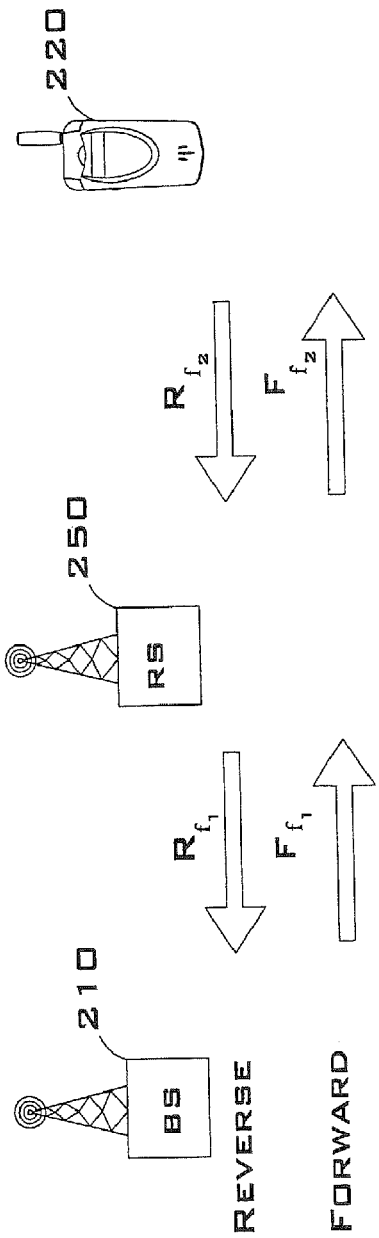
FIG. 2b is an illustration of the operation of a prior art translating repeater station.
Figure 3:
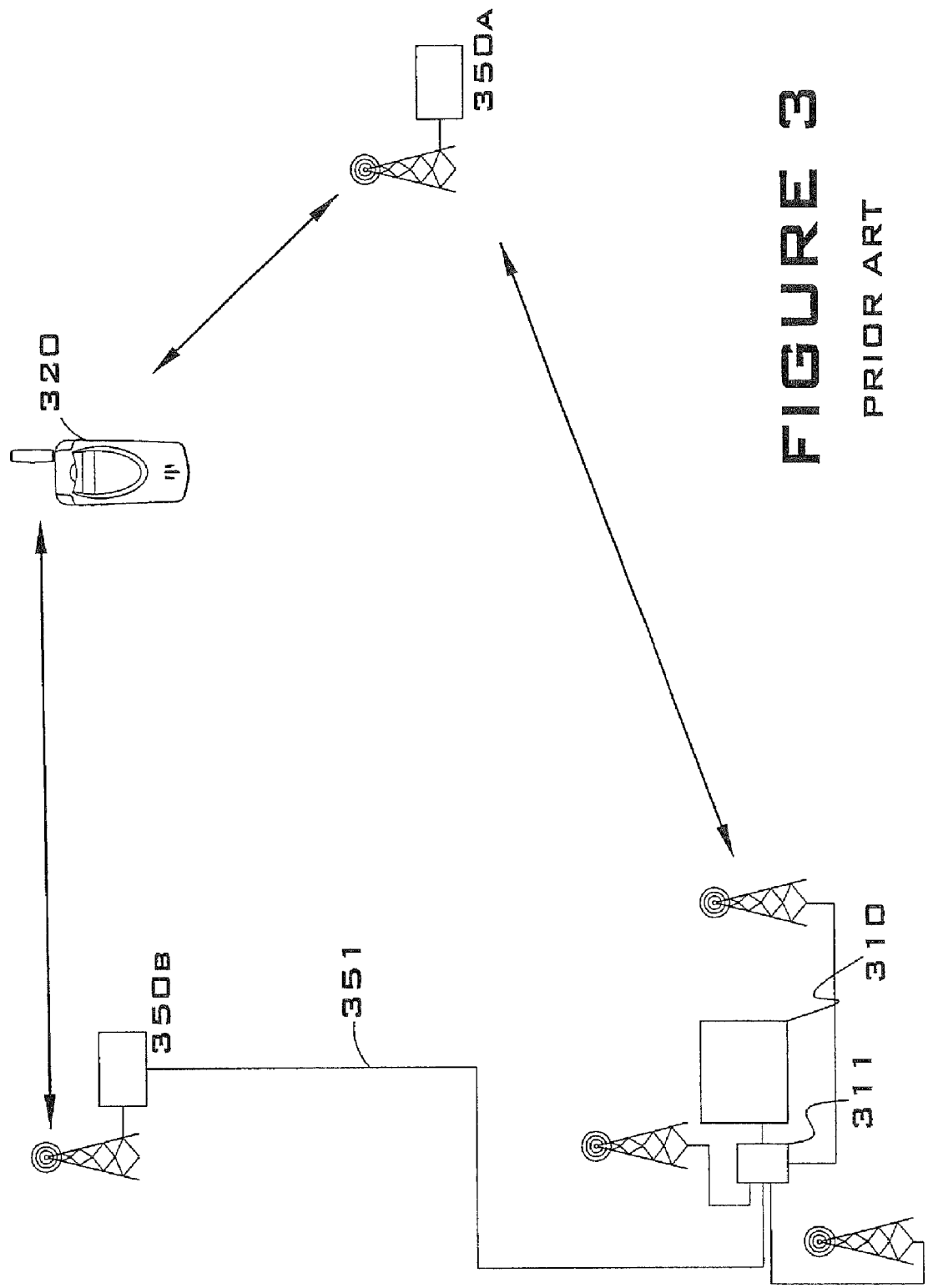
FIG. 3 is an illustration of a prior art wireless communication system with repeater stations connected with an RF link and over a tether.

An important aspect of the presently disclosed subject matter is a network analysis system can determine when a received signal from a mobile has passed through a repeater. Prior art systems do not have this capability and consequently treat all the signals received by the base station as having been received directly from the target mobile. For example, the ability to determine if a signal from a mobile has passed through a repeater enables embodiments of the disclosed subject matter in a network analysis system to provide more efficient network management. The foregoing are exemplary only and shall not be used to limit the invention. These examples and others are discussed in more detail below.

The present subject matter relates to the case where signals can be received at base stations, or other receivers, either directly from the mobile appliance or through a repeater. The ability to discern the difference between direct signals and repeated signals (i.e., signals that arrive via a repeater) allows the network analysis system to collect data important to system operators. In the forgoing discussions the subject matter will be described in terms of a network analysis system, however as noted above, any network receiver or sensor receiving a signal from the repeaters can employ the described method.

This disclosed subject matter allows repeater identification via the insertion of a low power, amplitude modulated RF signature based on a second signal. This co-channel signal is generated by applying a specific form of Amplitude Modulation (AM) to the entire repeater signal bandwidth and serves as a signature identifying that a mobile is being served through a particular repeater station, whose identity can be uniquely determined from the RF characteristics introduced by the repeater itself. The magnitude of the inband signal as well as any adjacent channel interference caused by the AM process can be controlled. When no signal is present in the repeater pass-band, the AM process generates a signature signal buried deep within the noise. When a signal is present, the signature signal can be used to uniquely identify the repeater.

In order to accomplish this, the following operations are performed within the repeater. The wideband signal w(t) or primary signal constituting the signal to be repeated at the repeater is AM modulated using a narrowband signal of the form (1+r(t)), where for purposes of this disclosure r(t) is referred to as the second signal. The AM modulated signal is then subject to any pre-existing methodology of repetition used at that repeater, generally expressed as a delay on the signal followed by amplification.

The mathematical effect of this form of modulation is to generate a co-channel signal (e.g., the signature signal) w(t)r(t) in the repeater bandwidth. The 1 in the term (1+r(t)) simply replicates the primary signal (e.g., the mobile signal for uplink signals or the down link for base station signals). Since AM modulation is equivalent to multiplication, the modulation can also be viewed as multiplication of w(t) by the function (1+r(t)).

To illustrate the concept further, consider a particular narrowband channel. In the narrowband channel, if an active mobile call using signal s(t) was in progress, the co-channel signal generated by the AM process will be of the form s(t)r(t). If the channel were inactive, the co-channel signal will be of the form n(t)r(t) where n(t) is noise. By suitably controlling the norm (or average amplitude) of r(t), the magnitude of the co-channel component can be maintained at a much reduced power level with respect to the primary mobile signal s(t). Further, any spectral spillage into adjacent bins can be reduced below the noise power level in those bins by suitably manipulating the amplitude of r(t). Thus, the amplitude control of the signature signals allows the amplitude of the signature signal to lie buried in the naturally occurring noise that is present at the final destination receiver, i.e., the base station, the mobile appliance, or another network device.

By controlling the amplitude of the second signal r(t), both the co-channel signal component and the adjacent channel interference can be made as large as or as small as desired. The amplitude control is determined based on the relative power desired between the primary signal s(t) and the signature signal or co-channel component. After a proper determination is made, this amplitude is fixed at the repeater during operation. Generally the ratio of the primary signal and the secondary signal is greater than unity.

Thus, for example in an active cellular channel, the introduced repeater identification signal, the signature signal can be at a power level 9 dB or lower than the primary signal; whereas, in an inactive channel, the signature signal will be 9 dB or lower than the preexisting noise in that channel. In every channel, the corresponding signature signal is preferably at a power level 9 dB or lower than the pre-existing signal level in that channel. The 9 dB value is chosen simply to quantify the concept and any other number can be selected with equal applicability. For a given primary signal s(t), it is apparent that the second signal r(t) distinguishes the particular repeater. Thus each repeater has a unique second signal r(t), which is a narrowband waveform.

The collection of such second signals r(t) over a set of repeaters, denoted S, may be drawn from sets of waveforms with specific properties. For example, the set S may be orthogonal, quasi-orthogonal, or shift-orthogonal. The properties of the second signals r(t) used to generate the set S will, among other things, depend on the number of repeaters implemented in a cellular system cell or sector. Code sequences such as Golay-Hadamard and other sequences are equally envisioned when appropriate.

Figure 7:
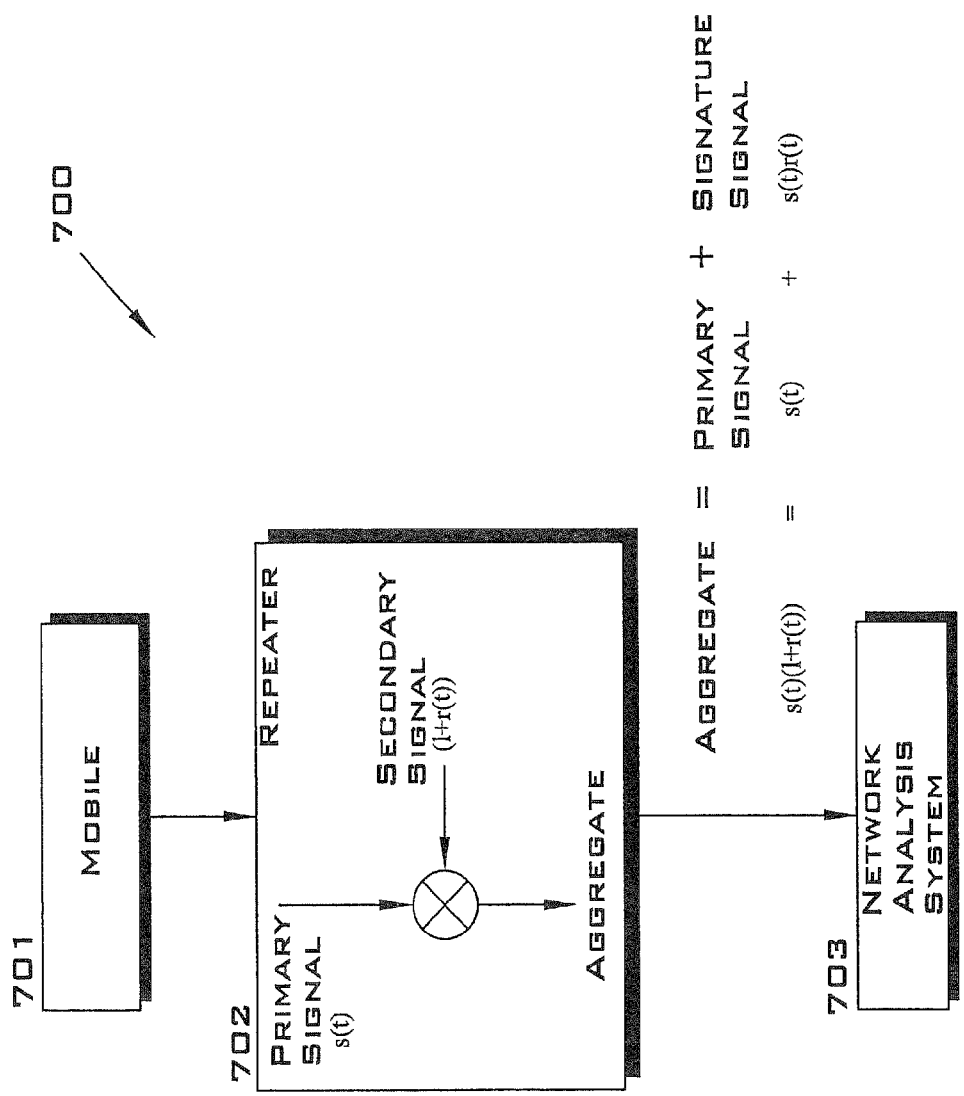
FIG. 7 is a schematic diagram of a repeater, mobile and network analysis system according to an embodiment of the present subject matter.

An aspect of the disclosed subject matter that needs to be highlighted is that the signature signal s(t)r(t) is formed as a function of the primary signal and the second signal. The signature signal is not the second signal. The signature signal differs from other signature signals based not only on the particular repeater but also on the primary signal that is input to the repeater. As shown in FIG. 7, the repeater 702 receives a primary signal from the mobile appliance 701 or other network transmitter. The primary signal s(t) is then multiplied by a function (1+r(t)) where r(t) is a second signal unique to the repeater. The output of the repeater is an aggregate signal s(t)(1+r(t)) including both the primary signal s(t) and the signature signal s(t)r(t). The network analysis system 703 then receives and processes the aggregate signal as described later to determine if the signal was received via a repeater and, if so, determines the specific repeater.

Figure 8:
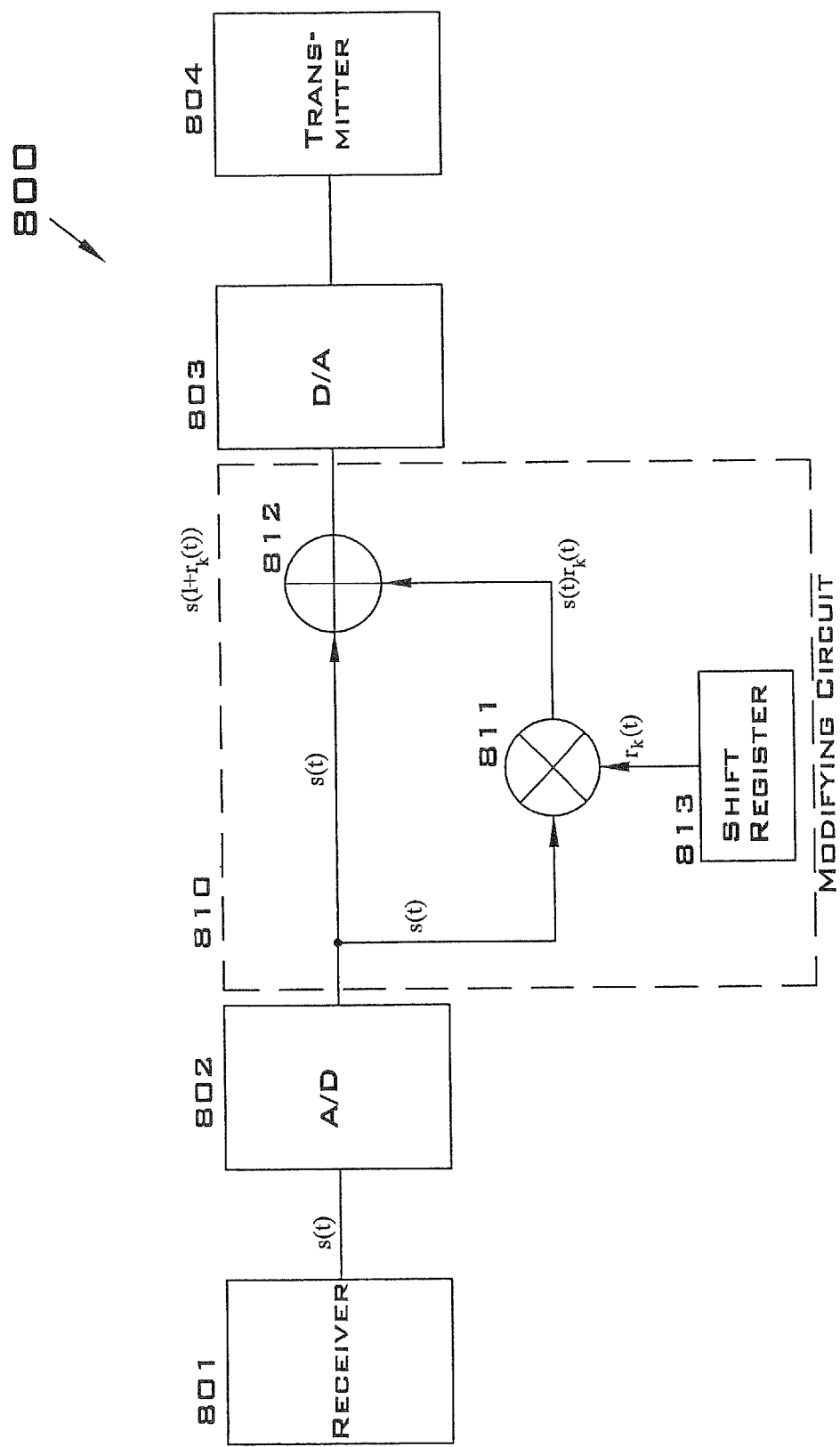
FIG. 8 is a schematic diagram of a repeater with a modification circuit according to an embodiment of the present subject matter.

FIG. 8 is a representation of an embodiment of a modification circuit used to create the aggregate signal from the primary signal. In the repeater 800, the receiver 801 receives and supplies the primary signal s(t) to an A/D converter 802 and the digital signal is supplied to the modification circuit 810. The modification circuit includes a cyclic shift register 813, a signal multiplier 811 and a signal adder 812. As illustrated, the cyclic shift register 813 and the primary signal are inputs to the signal multiplier 811. The primary signal and the output of the signal multiplier 813 are connected to the inputs of the signal adder 812 and the output of the signal adder is connected to the D/A converter 803 which provides the analog aggregate signal to a transmitter 804. The cyclic shift register 813 provides a repeating sequence $r_k(t)$. The modification circuit could likewise be entirely analog or other combinations of analog and digital. The modification circuit shown is for illustrative purposes only and is not meant to limit the scope of the present subject matter.

The repeaters may either apply their identifying signals or signature signals, synchronously or asynchronously. A synchronous approach would require the repeaters to operate in unison with an extraneous clock but would provide greater discrimination of the repeater at the location sensor. The repeaters may also apply identifying signals in a repetitive loop so that the waveforms r(t) repeatedly cycle.

Figure 4:
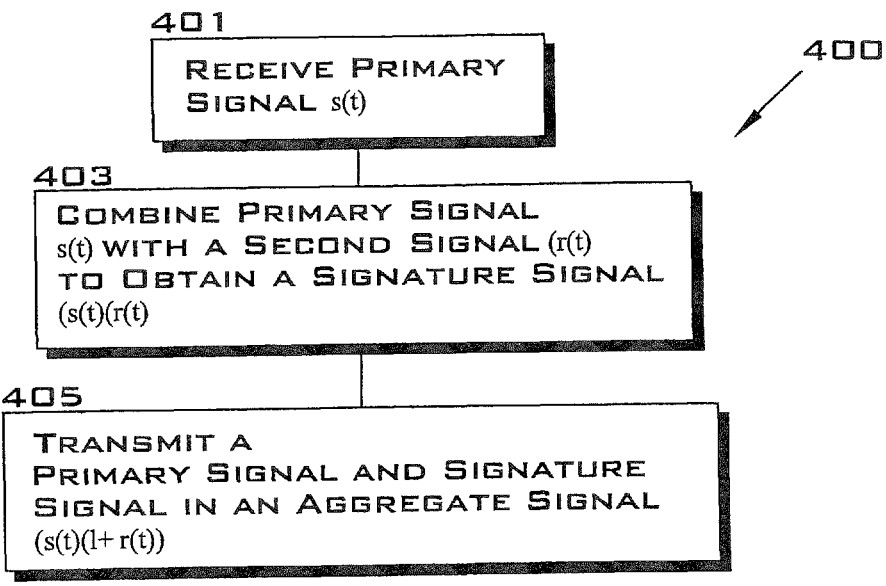
FIG. 4 is a representative flow chart for the operation of a repeater in an embodiment of the present subject matter.

FIG. 4 is a representative flow chart describing an embodiment of a repeater watermarking a primary signal. In the method 400, the repeater receives a primary signal s(t) as shown in Block 401. The primary signal, as indicated earlier, can come from a mobile appliance as an uplink signal, a base station as a downlink signal, or from another network device such as another repeater. The repeater then creates a signature signal as a function of the primary signal and a second signal which is associated with the repeater. In the embodiment shown in FIG. 4, the primary signal s(t) is multiplied by the second signal r(t) to obtain the signature signal s(t)r(t) as shown in Block 403. The repeater then transmits the primary signal s(t), or a copy thereof, along with the amplitude controlled signature signal s(t)r(t) as an aggregate signal s(t)(1+r(t)) as shown in Block 405. The second signal r(t) may be a code sequence.

The detection of the signature signal at the network sensor or receiver is formed from two hypotheses. The signal in a narrowband channel at the location sensor is either of the two hypotheses. Hypothesis 1: where the received signal is the primary signal s(t) plus noise; or Hypothesis 2: where the received signal is s(t)(1+r(t)) plus noise.

The network sensor or receiver determines which hypothesis is true and if Hypothesis 2 is true, identifies which r(t) in S is applicable thereby identifying the repeater used.

Figure 5:
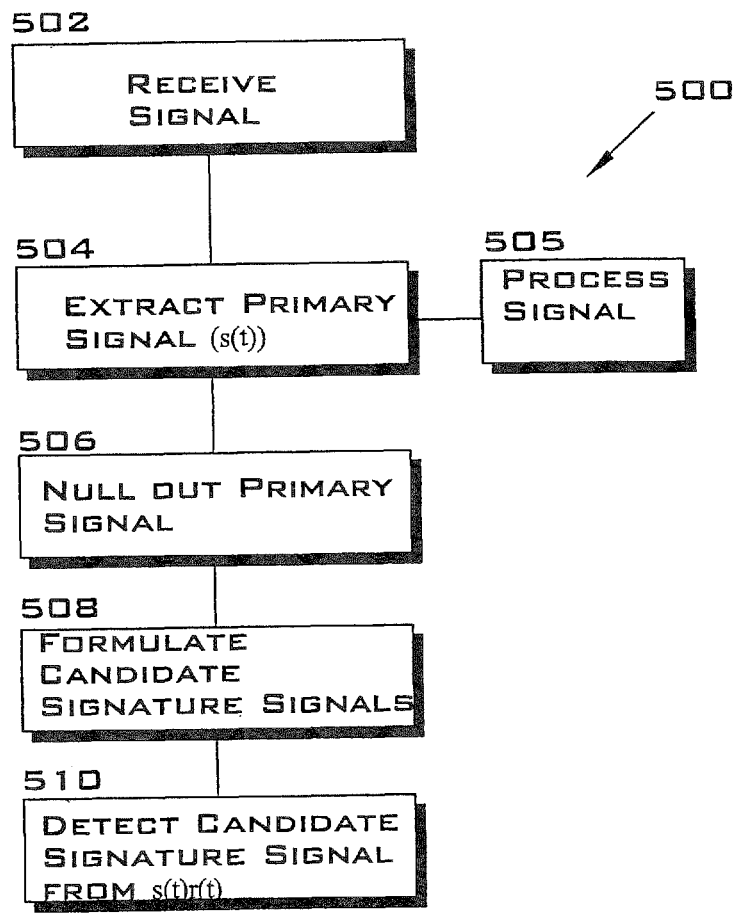
FIG. 5 is a representative flow chart for the operation of a network analysis system according to an embodiment of the present subject matter.

Since it is generally very difficult to search for the signature signal without first extracting the primary signal from the aggregate signal received, the signal recovery proceeds in two stages. An embodiment of a method for signal recovery is shown in FIG. 5. The first stage is the detection of the primary signal, and the second stage is the computation of candidate signature signals or candidate aggregate signals based on the derived primary signal and all possible candidate second signals of repeaters from which the aggregate signal could be received from, i.e., all of the repeaters in the set S or a subset of S within a predetermined propagation distance from the sensor.

A receiver receiving a signal (e.g., a mobile uplink signal) proceeds in the following manner to determine whether the call was amplified by a repeater, and the identity of the repeater as shown in FIG. 5.

The receiver receives a signal, which may or may not be an aggregate signal, as shown in Block 502. The signal received by the receiver may come directly from a mobile or other system node in which case the signal is not an aggregate signal. If the signal is received via a repeater then it is an aggregate signal. The network analysis system extracts the primary signal as shown in Block 504, for example, by determining the signal waveform s(t) by methods known to those of skill in the art. Since the signature signal (if the signature signal exists) is below the noise level in the channel, this detection proceeds as well as it would in the absence of the AM process. That is, the introduction of the signature signal s(t)r(t) does not compromise the detection of the primary mobile signal s(t) in any significant manner. The extracted primary signal is processed to recover the data or voice information in Block 505.

The system may then null out the primary signal s(t) from the aggregate signal s(t)(1+r(t)) plus noise as shown in Block 506. Depending on the nulling technique used, the purity of extracting the residual signal s(t)r(t) will differ. In general, the result of the nulling process will be to generate a noisy version of the signal s(t)r(t). An additional source of perturbation on the signal s(t)r(t) will result if the channel is filtered. However, this step of nulling out the primary signal is not necessary for some embodiments of the present subject matter.

Having determined the primary signal s(t), it is possible to formulate the candidate signature signals s(t)r(t) as shown in Block 508. The present disclosure also envisions, for embodiments that do not null out the primary signal, formulating candidate aggregate signals s(t)(1+r(t)). The possible second signals r(t) associated with repeaters in operational range of the receiver can be acquired and stored in a number of ways known to those of skill in the art. The problem then reduces to detection of the known signature signal s(t)r(t) (possibly filtered) in the aggregate signal s(t)(1+r(t)) plus noise (if not nulled) or detection of the known signature signal s(t)r(t) (possibly filtered) in the nulled aggregate signal s(t)r(t) plus noise as shown in Block 510 where the primary signal is nulled. Detection of a known signal in noise is a problem that has been solved by numerous known methods and all applicable prior art methods are envisioned. If the candidate signature signal s(t)r(t) is not detected or the candidate aggregate signal s(t)(1+r(t)) is not detected, Hypothesis 1 holds, thus eliminating the possibility that the mobile signal was operated on (e.g., amplified) by a repeater. If the signal s(t)r(t) is detected, Hypothesis 2 holds, and the particular r(t) that effected the detection then unambiguously identifies the repeater.

Figure 6:
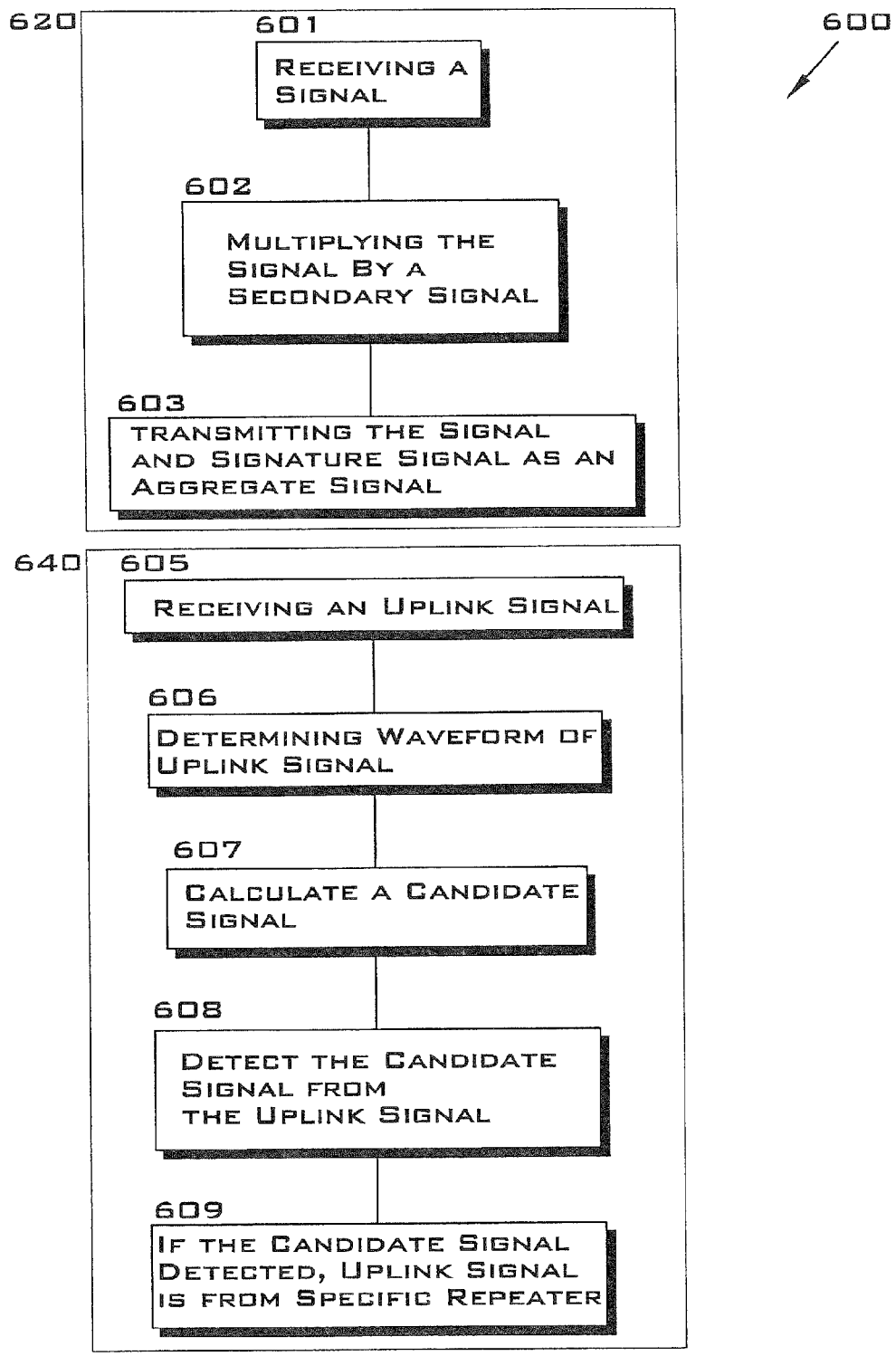
FIG. 6 is a representative flow chart for determining whether an uplink signal is received from a repeater according to an embodiment of the present subject matter.

FIG. 6 is a representative flow chart for a method 600 for determining if an uplink signal was received via a repeater according to an embodiment of the present subject matter. At the repeater 620 a primary signal is received from a mobile operating in the service area of the repeater 620 as shown in Block 601. The primary signal is then multiplied by a second signal, for this embodiment, sequence associated with the particular repeater 620 as shown in Block 602. The primary signal and the signature signal which is a function of the primary signal and the sequence is transmitted as an aggregate signal to the base stations and wireless location sensors within range of the repeater as shown in Block 603.

The waveform of the primary signal s(t) (e.g., uplink signal) is determined using known prior art methods as shown in Block 606. From the signal waveform of the primary signal s(t), candidate signals, either a candidate signature signal s(t)r(t)' or a candidate aggregate signal s(t)(1+r(t))' is calculated using the known second signals r(t). The network analysis or geolocation system then uses prior art methods to detect the candidate signature signals or candidate aggregate signals in the uplink signal as shown in Block 608. If a candidate signal is found, then the uplink signal is received via a repeater and the specific repeater can be determined by the associated sequence as shown in Block 609.

Another embodiment envisioned by the current subject matter is implemented with a primary and secondary receiver. In this embodiment the primary receiver functions as normal to receive a first signal in a communication system whether or not the first signal is from a repeater or other network device and thus whether or not the first signal is an aggregate or composite signal. As described previously, the primary receiver extracts the primary signal s(t) from the first signal w(t). In addition to recovering the data from the primary signal, the primary signal is also provided to a secondary receiver.

The secondary receiver can be a separate receiver co-located at the primary receiver or contained within the primary receiver. In either case the methodology is generally the same.

The secondary receiver also receives the first signal. Since the secondary receiver has both the first signal w(t) and the primary signal s(t) provided by the primary receiver. An inverse transfer function can be applied such that the modification, if any, to the primary signal s(t) will be revealed. The existence of the modification may be an indication that the signal was operated on by a repeater or other network device; and since each modification in the system is unique, the identity of the repeater or other network device can also be determined. A benefit of this latter embodiment is that the secondary receiver can be implemented as an add on, where the secondary receiver contains the hardware and software for determining the modification and is simply tapped into the existing primary receiver to recover the primary signal.

No constraint exists on combining the scheme of this subject matter with other schemes to identify a repeater. For example, in a GSM cellular protocol, a parameter termed the Timing Advance (TA) parameter may be used to identify the radius at which a particular mobile may be located. This TA parameter may be used jointly with the scheme proposed here to increase the number of identifiable repeaters in a cell or sector.

While preferred embodiments of the present inventive system and method have been described, it is to be understood that the embodiments described are illustrative only and that the scope of the embodiments of the present inventive system and method is to be defined solely by the appended claims when accorded a full range of equivalence, many variations and modifications naturally occurring to those of skill in the art from a perusal hereof.

What we claim is:

1. In a communication system including a first node, a second node, and a repeater, wherein the first node receives a first signal from the second node either directly or via the repeater, a method of applying a known distortion to a signal to enable a determination of a signal received by the first node is received directly from the second node or indirectly through the repeater, comprising the steps of:
   at the repeater receiving a primary signal s(t) and creating a secondary signal w(t) as a function f(r(t), s(t)) of the primary signal s(t) and a known modification $r_k(t)$, wherein the known modification $r_k(t)$ uniquely identifies the repeater; and
   transmitting the primary signal s(t) injected with the secondary signal w(t) as the first signal to the primary receiver.

2. The method of claim 1, wherein the communication system is a wireless communication system.

3. The method of claim 1, wherein the primary receiver is a network analysis system.

4. The method of claim 1, wherein the second node is a mobile unit.

5. The method of claim 1, wherein the secondary signal is transmitted 9 db or less than the primary signal.

6. The method of claim 1, wherein the known modification is multiplication by a identification signal.

7. The method of claim 6, wherein the identification signal is AM.

8. The method of claim 1, wherein the function f(r(t), s(t)) is $s(t)(1+r_k(t))$.

9. The method of claim 1, wherein r(t) is determined from an inverse function g(w(t), s(t)) of the secondary signal w(t) and the primary signal s(t), where g is the inverse of f.

* * * * *